United States Patent Office 3,385,848
Patented May 28, 1968

3,385,848
PROCESS FOR THE CONVERSION OF THE ANGULAR METHYL GROUPS OF STEROIDS
Albert Wettstein, Riehen, Oskar Jeger, Zurich, Georg Anner, Karl Heusler, and Jaroslav Kalvoda, Basel, Charles Meystre, Reinach, and Peter Wieland, Basel, Switzerland, assignors to Ciba Corporation, New York, N.Y., a corporation of Delaware
No Drawing. Continuation-in-part of application Ser. No. 102,114, Apr. 11, 1961. This application Sept. 19, 1962, Ser. No. 224,347
Claims priority, application Switzerland, Apr. 14, 1960, 4,272/60; Sept. 22, 1961, 11,068/61
29 Claims. (Cl. 260—239.55)

ABSTRACT OF THE DISCLOSURE

The invention includes oxygenation of the angular methyl groups in positions 10 and 13 of steroids by treating $11\beta$-hydroxysteroids with heavy metal acylates having an oxidizing action in the presence of iodine, and if desired treating the resulting iodides with a hydrolysing or acylolytic agent and/or oxidising the products so obtained. The process furnishes $18:11\beta$-oxidosteroids or $19:11\beta$-oxidosteroids which may be substituted in position 18 or 19 by iodine or by alkoxy or acyloxy groups. The 18-substituted or 19-substituted $11\beta:18$-oxido or $11\beta:19$-oxido compounds are transformed either by direct hydrolysis or by exchange of the iodine atom for an acyloxy radical and subsequent acid or alkaline hydrolysis into $18$-hydroxy-$18:11\beta$-oxidosteroids or $19$-hydroxy-$19:11\beta$-oxidosteroids representing the hemiacetals of the $11\beta$-hydroxy-18-als or -19-als respectively. These compounds, or also the iodo compounds, can if desired, be oxidised to the $18:11\beta$-lactones or $19:11\beta$-lactones of the steroid-18-acids or -19-acids which are also formed by direct oxidation of the resulting unsubstituted oxidosteroids with, for example, chromium trioxide or ruthenium tetroxide.

---

This is a continuation-in-part of application Ser. No. 102,114, filed Apr. 11, 1961, and now abandoned.

The present invention provides a process for the oxidative conversion of the angular methyl groups of steroids.

The invention is based on the observation that the angular methyl groups in positions 10 and 13 can be oxygenated in a simple manner by treating $11\beta$-hydroxysteroids with heavy metal acylates having an oxidising action in the presence of iodine, and if desired treating the resulting iodides with a hydrolysing or acylolytic agent and/or oxidising the products so obtained.

The present process furnishes $18:11\beta$-oxidosteroids or $19:11\beta$-oxidosteroids which may be substituted in position 18 or 19 by iodine or by alkoxy or acyloxy groups. The 18-substituted or 19-substituted $11\beta:18$-oxido or $11:19\beta$-oxido compounds are transformed either by direct hydrolysis or by exchange of the iodine atom for an acyloxy radical and subsequent acid or alkaline hydrolysis into 18-hydroxy-$18:11\beta$-oxidosteroids or 19-hydroxy-$19:11\beta$-oxidosteroids representing the hemiacetals of the $11\beta$-hydroxy-18-als or -19-als respectively. These compounds, or also the iodo compounds, can if desired, be oxidised to the $18:11\beta$-lactones or $19:11\beta$-lactones of the steroid-18-acids or -19-acids which are also formed by direct oxidation of the resulting unsubstituted oxidosteroids with, for example, chromium trioxide or ruthenium tetroxide.

The reactions of the invention may, for example, be represented by the following scheme of partial formulae:

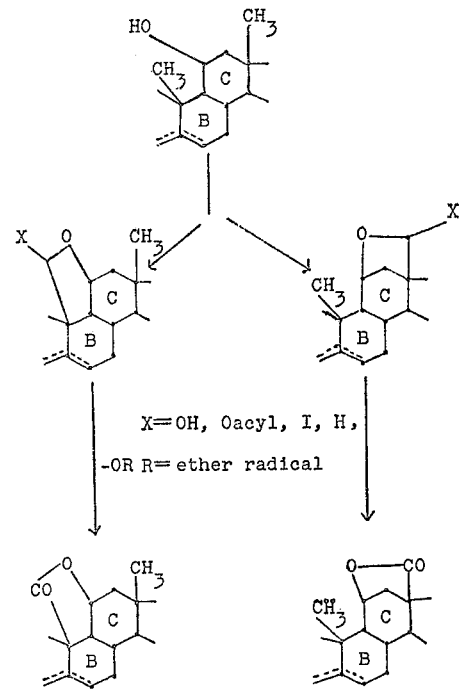

X=OH, Oacyl, I, H,
—OR R= ether radical

The resulting 18-oxygenated compounds, more especially those of the pregnane series, are important intermediates for the preparation of compounds of the type of the highly active adrenocortical hormone aldosterone. The 19-oxygenated compounds, on the other hand are very important for the preparation of 19-oxygenated steroids of the type of Strophantin and its conversion products, more especially for the manufacture of the important 19-norsteroids.

Where the main product formed is an 18-oxido or a 19-oxido compound seems to depend substantially on the configuration of the rings A and B and on the substitution of the steroid skeleton. While compounds containing a double bond in position 4:5 or 5:6 yield predominantly 11:19-oxidosteroids, the compounds of the $5\alpha$- and $5\beta$-series that are saturated in said positions yield a mixture of 18:11- and 19:11-oxido-steroids.

According to the present process the $11\beta$-hydroxy steroids used as starting materials are reacted with compounds yielding oxidising acyloxy radicals, such as oxydising heavy metal acylates, preferably lead tetraacetate, in the presence of iodine, if desired, with addition of a weak base, and/or with irradiation. The process can be performed, for example, as follows: The starting material is dissolved in a solvent that is inert towards the oxidant, for example in a hydrocarbon; lead tetraacetate, iodine and a weak base, for example calcium carbonate, are then added, and the reaction mixture is stirred and heated under atmospheric or superatmospheric pressure. Particularly suitable solvents are saturated cyclic hydrocarbons, such as cyclohexane, methyl-cyclohexane, dimethylcyclohexane, aromatic hydrocarbons, such as benzene, or mixtures of said solvents. The requisite time of reaction depends on the temperature and/or the solvent used. When the reaction is performed in boiling cyclohexane, the reaction is as a rule complete after about 6 hours. According to an advantageous variant of the process lead tetraacetate is first reacted with iodine in the presence of calcium carbonate, and the 11-hydroxysteroid is then added. It is of advantage to initiate and accelerate the reaction by irradiation with natural or artificial light. For working up the reaction mixture the inorganic salts are filtered off and any excess of iodine present is removed by agitation with thiosulfate solution.

The reaction products present in the reaction solution are in part 11$\beta$,18-oxido- and 11$\beta$,19-oxido steroids and in part 18-hydroxy-11,18-oxido or 19-hydroxy-11,19-oxido-steroids, especially in the acetylated form. The 18-iodo-11$\beta$:18-oxido or 19-iodo-11$\beta$:19-oxido steroids may be hydrolysed, for example by treatment with sodium acetate and dilute acetic acid, whereby at the same time—if this has not already occurred during the treatment with lead tetraacetate and iodine—any existing ketals and acetals are split to form free ketones and aldehydes, or hemiketals or hemiacetals respectively. In particular, 18-iodo-11$\beta$:18-oxido-20-ethylenedioxypregnanes give rise to 11$\beta$-hydroxy-18:20-dioxopregnanes which may also be present as 11$\beta$:18-oxido-18-hydroxy compounds. When, on the other hand, the crude reaction product is reacted in a neutral solvent (for example in acetone or dimethyl formamide) with an alkali metal salt or heavy-metal salt of a carboxylic acid (for example with sodium acetate, potassium acetate or silver acetate), the 18-iodo or 19-iodo compounds yield the 18-acyloxy or 19-acyloxy compounds respectively, from which the free 18-hydroxy or 19-hydroxy compounds are obtained by acid hydrolysis, for example by heating with dilute acetic acid or with an aqueous mineral acid in a water-miscible solvent, or by alkaline hydrolysis, for example with an alkali metal bicarbonate, carbonate or hydroxide.

For the conversion of the 18-hydroxy-18:11$\beta$-oxido and 19-hydroxy-19:11$\beta$-oxido compounds of the invention into the 18:11$\beta$-lactones and 19:11$\beta$-lactones respectively, a variety of oxidants is available, above all compounds of hexavalent chromium, such as chromium trioxide, for example in the form of the pyridine complex, or in acetic acid or sulfuric acid solution, or manganese dioxide. The 18:11$\beta$-lactones and 19:11$\beta$-lactones can also be made directly from the crude products containing the 18-iodo-18:11$\beta$-oxido or 19-iodo-19:11$\beta$-oxido compounds, when the oxidation is conducted in the presence of a heavy-metal chromate, for example lead chromate or more especially silver chromate. A small amount of lactones is even formed already during the treatment of the 11$\beta$-hydroxy steroids with iodine and the heavy metal acylate under the action of such oxidative mixture.

Starting materials suitable for use in the present process are 11$\beta$-hydroxy compounds of the androstane, pregnane, cholane, cholestane, stigmastane, spirostane and cardanolide series whose ring system may contain further substituents, more especially in one or several of the positions 1, 2, 3, 4, 5, 6, 7, 8, 9, 12, 14, 15, 16, 17, 21, such as free or functionally converted oxo groups, or esterified or etherified hydroxyl groups, alkyl, for example methyl, groups and/or halogen atoms. The term "functionally converted oxo groups" describes ketalized oxo groups or oxo groups converted into enol derivatives, such as enolethers and enolesters. Furthermore, the starting materials may also contain double bonds or oxido groups, for example, starting from carbon atom 5 or in position 16:17. Specific starting materials are, for example, the following compounds:

3$\alpha$-acyloxy-11$\beta$-hydroxy-17-ethylenedioxy-5$\beta$-androstanes,
3$\beta$:17$\beta$-diacyloxy-11$\beta$-hydroxy-5$\alpha$-androstanes,
$\Delta^5$-3-ethylenedioxy-11$\beta$-hydroxy-17$\beta$-acyloxyandrostenes,
$\Delta^5$-3:20-bisethylenedioxy-11$\beta$-hydroxypregnene,
$\Delta^4$-3:20-dioxo-11$\beta$-hydroxy-21-acyloxypregnenes,
3$\alpha$-acyloxy-11$\beta$-hydroxy-20-ethylenedioxy-5$\beta$-pregnanes,
3$\beta$-acyloxy-11$\beta$-hydroxy-20-ethylenedioxy-5$\alpha$-pregnanes,
3:20-bisethylenedioxy-11$\beta$-hydroxy-21-acyloxy-5$\beta$-pregnanes,
3$\alpha$-acyloxy-11$\beta$-hydroxycholanic acid methyl ester,
$\Delta^5$-3$\beta$-acyloxy-11$\beta$-hydroxycholestenes,
3$\beta$-acyloxy-11$\beta$-hydroxyspirostanes,
$\Delta^5$-3$\beta$-acyloxy-11$\beta$-hydroxyspirostenes,
$\Delta^5$-3-ethylenedioxy-11$\beta$-hydroxyspirostenes,
and the like.

Another object of the invention are 19-iodo-11$\beta$:19-oxidosteroids, 19-hydroxy-11$\beta$:19-oxidosteroids, 11$\beta$-hydroxy-19-oxosteroids and 11$\beta$:19-lactones of 11$\beta$-hydroxysteroid-19-acids, more especially such steroids as contain a double bond in position 4:5 or 5:6. The aforementioned 19-substituted steroids may belong to the androstane, pregnane, cholanic acid, spirostane, cardanolide or cholestane series. As specific compounds there may be mentioned the following compounds: $\Delta^4$-3:20-dioxo - 19-iodo-11$\beta$:19-oxidopregnene, $\Delta^4$-3:20-dioxo-19-hydroxy-11$\beta$:19-oxidopregnene, and the 19:11-lactone of $\Delta^4$-3:20-dioxo-11$\beta$-hydroxypregnene-19-acid as well as the corresponding $\Delta^5$-3:20-bisethyleneketals; also the 19:11-lactone of 3$\alpha$-acetoxy-11$\beta$-hydroxy-20-oxo-5$\beta$-pregnane-19-acid,
$\Delta^4$-3-oxo-17$\beta$-hydroxy-19-iodo-11$\beta$:19-oxidoandrostene,
$\Delta^4$-3-oxo-17$\beta$:19-dihydroxy-11$\beta$:19-oxidoandrostene,
and the
19:11-lactone of $\Delta^4$-3-oxo-11$\beta$:17$\beta$-dihydroxyandrostene-19-acid
and their 17-esters and $\Delta^5$-3-ethyleneketals.

The above-mentioned compounds are valuable intermediates for the manufacture of 19-nor steroids which can be obtained as follows:

When, after having introduced the 19-oxo or 19-acid grouping, a $\Delta^4$-3-oxo grouping is formed, by oxidising a $\Delta^5$-3-hydroxy grouping, or by ketal cleavage of a $\Delta^5$-3-ethyleneketal, the angular aldehyde or acid group is easy to eliminate by treatment with an alkaline agent, for example by heating with an alkali metal hydroxide, in an anhydrous or aqueous solution, with formation of a 19-nor steroid. Thus, the $\Delta^4$-3-oxo-11$\beta$:19-oxido-17:19-dihydroxyandrostene which is easy to prepare by the present process, or the 19:11-lactone of $\Delta^4$-3-oxo-11$\beta$:17$\beta$-dihydroxyandrostene-9-acid respectively, yields on treatment with an alkali $\Delta^4$-3-oxo-11$\beta$:17$\beta$-dihydroxy-19-nor androstene in which, if desired, the 11$\beta$-hydroxy group can be eliminated in known manner, to yield the known 19-nortestosterone. The 19:11-lactone of $\Delta^4$-3:20-dioxo-11$\beta$-hydroxypregnene-9-acid yields in a similar manner 11$\beta$-hydroxy-19-norprogesterone, or after elimination of water and isomerisation of the double bond formed, the progestatively active 3:20 - dioxo - $\Delta^{4:9(10)}$ - 19 - norpregnadiene. 11$\beta$-hydroxydiosgenin yields, via $\Delta^5$-3$\beta$-acetoxy-11$\beta$:19-oxido-19-hydroxyspirostene, and by subsequent oxidation according to Oppenauer and alkali treatment, the $\Delta^4$-3-oxo-11$\beta$-hydroxy-19-norspirostene which is degraded in a manner similar to that for the corresponding 10-methyl compound to 11$\beta$-hydroxy-19-norprogesterone.

The invention further includes 18-iodo-11$\beta$:18-oxidosteroids and 18-hydroxy- and 18-alkoxy-11$\beta$:18-oxidosteroids saturated in rings A and B viz. 11$\beta$-hydroxy-18-oxosteroids, and 18:11-lactones saturated in rings A and B of 11$\beta$-hydroxysteroid-18-acids, more especially of the 5$\alpha$-pregnane and 5$\beta$-pregnane series. The 5$\alpha$-pregnanes may contain a hydroxyl group in position 3$\beta$, and the 5$\beta$-compounds in position 3$\alpha$. As specific compounds the following may be mentioned: 3$\alpha$-hydroxy-11$\beta$:18-oxido-18-iodo-20-oxo-5$\beta$-pregnane, 3$\alpha$-18-dihydroxy-11$\beta$:18-oxido-20-oxo-5$\beta$-pregnane and its 18-ethylene glycol ether, the 18:11-lactone of 3$\alpha$:11$\beta$-dihydroxy-20-oxo-5$\beta$-pregnane-18-acid and the corresponding 3-esters and/or 20-ethyleneketals, 3:20 - dioxo - 11$\beta$:18-oxido-18-iodo-21-hydroxy - 5$\alpha$- and 5$\beta$-pregnane, 3:20-dioxo-11$\beta$:18-oxido-18:21-dihydroxy-5$\alpha$- and -5$\beta$-pregnane, the 18:11-lactone of 3.20 - dioxo - 11$\beta$:21-dihydroxy-5$\alpha$- and -5$\beta$-pregnane-18-acid, and their esters and/or 3:20-biethyleneketals or 3-monoethyleneketals.

The present invention further includes 19-unsubstituted 11$\beta$:19-oxidosteroids which are saturated in the rings A and B of the skeleton or contain double bonds, for example in positions 4–5 or 5–6, more especially steroids of the androstane and pregnane series. As specific compounds there may be mentioned: 3α-hydroxy-20-oxo-11β:19-oxido-5β-pregnane and the corresponding esters, 3:20-dioxo-11β:19-oxido-Δ⁴-pregnene and 20-ketals or 3-ketals, or 3:20 diketals thereof. These new 11β:19-oxido-steroids are likewise important intermediates for the manufacture of 19-nor-steroids, e.g. 3:20-dioxo-Δ⁴·⁹⁽¹⁰⁾-19-norpregnadiene. Thus, the first-named compound can be converted by oxidation with, for example, chromium-trioxide+pyridine complex, subsequent bromination and dehydrobromination, into 3:20 - dioxo-11β:19-oxido-Δ⁴-pregnene which, on treatment with acetic anhydride and para-toluenesulfonic acid and subsequent hydrolysis, is transformed into 3:20 - dioxo-19-hydroxy-Δ⁴·⁹⁽¹¹⁾-pregnadiene which can be converted into the above-mentioned product by basic treatment, for example the methanolic sodium hydroxide solution.

The 11,18-oxido-pregnane compounds obtainable by the present process are valuable intermediates for the manufacture of aldosterone and kindred compounds. Thus, for example, the 18:11-lactone of 3α-acetoxy-11β-hydroxy-20-oxo-5β-pregnane-18-acid is easy to hydrolyse with aqueous-methanolic hydrochloric acid to form the corresponding 3-hydroxy compound which, on oxidation with chromium trioxide in glacial acetic acid, yields the 18:11-lactone of 3:20-dioxo-11β-hydroxy-5β-pregnane-18-acid which, on bromination and dehydrobromination, is converted into the known 18:11-lactone of Δ⁴-3:20-dioxo-11β-hydroxypregnene-18-acid. In a similar manner the 18:11-lactone of 3:20-dioxo-11β-hydroxy-21-acetoxy-5β-pregnane-18-acid yields on bromination and dehydrobromination the corresponding, known Δ⁴-3-ketone which, on treatment with ethylene glycol and para-toluene-sulfonic acid in known manner, yields the 18:11-lactone of Δ⁵ - 3 - ethylenedioxy - 11β - hydroxy-20-oxo-21-acetoxy-pregnene-18-acid, which is also a known intermediate of the synthesis of aldosterone. The 3:20-dioxo-11β:18-oxido-18:21-dihydroxy-5β-pregnane, on the other hand, can be converted directly into an aldosterone-18:21-diacylate, after esterification of the two free hydroxyl groups by bromination and dehydrobromination.

In similar, known manner the corresponding 5α-pregnanes can be converted into the Δ⁴-3-keto derivatives. Of special value is the 3:20-dioxo-11β:18-oxido-18:21-dihydroxy-5α-pregnane (4:5-dihydroaldosterone) and its 21-esters, for example the formate, acetate, propionate, benzoate, trimethylacetate, phenylpropionate, meta-sulfobenzoate, phosphate, sulfate or the like, as well as the 18:11-lactone of 3:20 - dioxo-11β:21-dihydroxy-5α-pregnane-18-acid and its 21-esters. These compounds, more especially the first-named, in the form of water-soluble derivatives, possess a narcotic-sedative action and it can also be used for normalizing the circulation of blood in shock conditions such, for example, as are caused by certain endotoxins.

In the esters of the products obtained by the present process the acid radicals are those of saturated or unsaturated aliphatic, cycloaliphatic, aromatic or heterocyclic carboxylic acids, preferably such having from 1 to 20 carbon atoms, for example those of formic, acetic, propionic, a butyric or valeric acid such as n-valeric or trimethylacetic acid, a caproic acid such as β-trimethyl-propionic acid, of oenanthic, caprylic, perlargonic, capric acid, an undecylic acid, for example undecylenic acid, of lauric, myristic, palmitic or stearic acid, for example oileic acid, of a cyclopentyl-cyclohexyl- or phenyl-acetic or propionic acid, benzoic acid, a phenoxy-alkane acid such as phenoxyacetic, para-chlorophenoxyacetic, 2:4-dichlorophenoxyacetic, 4 - tertiary butylphenoxyacetic, 3-phenoxypropionic acid, 4-phenoxybutyric acid, of furan-2-carboxylic acid, 5-tertiary butyl-furan-2-carboxylic acid, 5-bromo-furan-2-carboxylic acid, a nicotinic or dicarboxylic acid such as oxalic, succinic or glutaric acid, of substituted carboxylic acids such as β-ketocarboxylic acids, for example of acetoacetic, propionylacetic, butyrylacetic or caprinoylacetic acid, of amino acids and the like.

The following examples illustrate the invention.

EXAMPLE 1

A mixture of 12.0 grams of dried lead tetraacetate, 4.0 grams of calcium carbonate and 400 cc. of cyclohexane is heated for a short time at 80° C., then mixed with 3.2 grams of iodine and refluxed for one hour with the aid of an infrared heater. The violet solution is allowed to cool slightly and mixed with 2.00 grams of 3α-acetoxy-11β - hydroxy - 20 - ethylenedioxy-5β-pregnane, and the whole is stirred on under reflux for 3 hours, and then cooled to 20° C.; the reaction mixture is filtered and the filter cake rinsed with 500 cc. of absolute ether. The filtrate is washed in a separating funnel once with 40 cc. of a sodium thiosulfate solution of 25% strength and 3 times with water, and then evaporated under vacuum at 20 to 25° C.

A solution of the evaporation residue (which contains inter alia 3α-acetoxy-11β:18-oxido - 18 - iodo-20-oxo-5β-pregnane) in 20 cc. of pyridine is added to a stirred suspension, cooled to 5° C., of 2.0 grams of chromium trioxide and 4.0 grams of silver chromate in 20 cc. of water and 20 cc. of pyridine; the reaction mixture is stirred for 16 hours at 60° C., then diluted with ether and water, undissolved constituents are filtered off, the aqueous layer is separated, the ethereal solution washed 3 times with water, dried with sodium sulfate and evaporated under vacuum. The resulting amorphous product (2.20 grams) is dissolved in 20 cc. of benzene and chromatographed on anhydrous silica gel. Elution with benzene+ethyl acetate 4:1 furnishes, successively: 742 mg. of an oil which on prolonged trituration with ether yields 128 mg. of the 18:11-lactone (melting at 160–165° C.) of 3α - acetoxy-11β-hydroxy-20-oxo-5β-pregnane-18-acid; then 590 mg. of an oil from which there are obtained 125 mg. of a further crystalline compound (melting at 146–149° C.) which on another crystallization from ether+petroleum ether yields 3α-acetoxy-20-oxo-11:19-oxido-5β-androstane melting at 165–169° C.; optical rotation $[\alpha]_D = +72.3° \pm 1°$ (c=0.763). The infrared spectrum of the compound contains absorption bands inter alia at 5.76, 5.86, 7.32, 8.09, 9.59, 9.80 and 9.85μ. Furthermore, there were eluted 450 mg. of a crystalline crude fraction which, on recrystallization from methylene chloride+ether, yields 275 mg. of the 18-glycol ether of 3α-acetoxy-18-hydroxy - 11β:18 - oxido-20-oxo-5β-pregnane melting at 202–204° C. Optical rotation $[\alpha]_D^{25} = +147.7°$ (c=0.998). The infrared spectrum contains absorption bands inter alia at 2.85, 5.80, 5.90, 8.10, 8.95, 9.12, 9.45, 9.70, 9.95, 10.15 and 10.50μ (in methylene chloride).

A 1:1-mixture of benzene and ethyl acetate elutes a small amount (80 to 100 mg.) of 3α-acetoxy-18-hydroxy-20-oxo-11β:18-oxido-5β-pregnane melting at 205–208° C. (in admixture with the glycol ether described the mixed melting point is by 10° C. lower). Optical rotation $[\alpha]_D = +99°$ (c.=0.987). Absorption bands in the infrared spectrum occur at 2.78, 2.92, 5.77, 5.85, 7.25, 7.34, 8.10, 9.55, 9.72 and 11.00μ. The same compound can also be obtained by subjecting the glycol ether described to acid hydrolysis.

The compound used as starting material is prepared thus:

8.73 grams of 3α-acetoxy-11-oxo-20-ethylenedioxy-5β-pregnane (prepared by partial ketalization of 3α-acetoxy-11:20-dioxo-5β-pregnane), dissolved in 150 cc. of absolute tetrahydrofuran, are added dropwise to a cooled, vigorously stirred suspension of 8.5 grams of lithium aluminum hydride in 350 cc. of absolute tetrahydrofuran, and the reaction mixture is refluxed for 2 hours. The excess reducing agent is decomposed by adding 17 cc. of ethyl acetate; 20 cc. of saturated sodium sulfate solution and 60 grams of solid anhydrous sodium sulfate are added, the whole is filtered, the residue is rinsed exhaustively with tetrahydrofuran, benzene and methylene chloride, and the filtrate is evaporated, to yield 8.30 grams of crude 3α:11β-dihydroxy-20-ethylenedioxy-5β-pregnane which, after one recrystallization from ethyl acetate+petroleum ether, melts at 141.5–143° C. Yield: 7.40 grams.

A solution of 7.30 grams of 3α:11β-dihydroxy-20-ethylenedioxy-5β-pregnane in 40 cc. of pyridine and 40 cc. of acetic anhydride is kept for 12 hours at 20° C. The solution is then concentrated under vacuum, mixed with water and extracted with ether+methylene chloride 4:1. The extract is washed with water until the washings run neutral, dried and evaporated to yield a crystalline residue from which by direct crystallization from methylene chloroide+methanol there are obtained 6.61 grams of 3α-acetoxy-11β-hydroxy-20-ethylenedioxy-5β-pregnane in the form of small prisms melting at 163° C. The infrared spectrum of the compound contains absorption bands at 2.36, 5.80, 8.07, 9.30, 9.47, 9.72, 10.15 and 10.5μ.

EXAMPLE 2

A solution of 100 mg. of 3α-acetoxy-18-hydroxy-11:18-oxido-20-oxo-5β-pregnane in 2.5 cc. of glacial acetic acid is mixed with 12 cc. of a solution of 1% strength of chromium trioxide in glacial acetic acid of 95% strength, and the whole is kept for 2½ hours at 20° C. The excess of the exidising agent is decomposed with 10 cc. of methanol, the reaction solution is evaporated under vacuum, and the residue is taken up in ether+methylene chloride. The solution is washed 3 times with water, dried and evaporated. One recrystallization of the product isolated in this manner from methylene chloride+petroleum ether yields 65 mg. of the pure 18:11-lactone of 3α-acetoxy-11β-hydroxy-20-oxo-5β-pregnane-18-acid melting at 195–198° C. Optical rotation $[\alpha]_D = +70°$ (c.=0.86). Its infrared spectrum contains bands inter alia at 5.68, 5.77, 5.85, 8.10, 8.57, 9.05, 9.27, 9.72, 10.16, 10.72, 11.30 and 12.15μ.

30 mg. of the 18:11-lactone of 3α-acetoxy-11β-hydroxy-20-oxo-5β-pregnane-18-acid are dissolved in 5 cc. of methanol, 0.5 cc. of concentrated hydrochloric acid is added, and the whole is kept for 60 hours at 20° C. The clear reaction solution is concentrated under vacuum to about 1 cc., taken up in ether, washed four times with water, dried, and evaporated under vacuum, to yield 24 mg. of a colorless foam which crystallizes on being sprinkled with ether. After one recrystallization from a mixture of methylene chloride, ether and petroleum ether, the resulting 18:11-lactone of 3α:11β-dihydroxy-20-oxo-5β-pregnane-18-acid melts at 190–191° C.; its infra-red spectrum contains absorption bands inter alia at 2.78, 5.65, 5.86, 8.60, 9.06, 9.65, 10.12, 10.65 and 10.75μ.

A solution of 14.5 mg. of the 18:11-lactone of 3α:11β-dihydroxy-20-oxo-5β-pregnane-18-acid in 1 cc. of glacial acetic acid is mixed with a solution of 24 mg. of chromium trioxide in 1 cc. of glacial acetic acid and 0.1 cc. if water, and the mixture is kept for 2½ hours at 20° C. The excess chromic acid is decomposed with 3 cc. of methanol, the reaction solution is evaporated under vacuum, and the residue is taken up in ether and washed with water until neutral. Evaporation of the dried ethereal solution furnishes 11.5 mg. of an amorphous product which is chromatographed on silica gel to yield 6.8 mg. of a crystallizing product which, according to its infra-red spectrum, is the slightly impure 18:11-lactone of 3:20-dioxo-11β-hydroxy-5β-pregnane-18-acid. After recrystallization from methylene chloride+hexane the fine needles melt at 228–230° C. The infrared spectrum contains bands inter alia at 5.63, 5.84, 6.92, 7.33, 8.25, 8.50, 8.70, 8.85, 9.05, 9.85, 10.12, 10.49 and 10.70μ.

The paper-chromatogram of the compound in the systems formamide/benzene and formamide/cyclohexane-benzene 1:1 reveals the same $R_f$ values (0.75 and 0.3 respectively) as a preparation obtained by hydrogenation of the 18:11-lactone of d:l-Δ⁴-3:20-dioxo-11β-hydroxypregnene-18-acid.

EXAMPLE 3

1.6 grams of iodine are added to a suspension, boiled for a short time, of 2.0 grams of calcium carbonate and 6.0 grams of pre-dried lead tetraacetate in 250 cc. of cyclohexane, and the mixture is refluxed for 1 hour. Thereupon 1.0 gram of Δ⁵-3:20-bisethylenedioxy-11β-hydroxy-pregnene is added. The whole is refluxed while being stirred for another 4 hours, by which time the reaction solution has become colorless; it is cooled to 20° C., filtered through a glass suction filter, and the residue is exhaustively washed with absolute ether. While cooling the filtrate with ice, it is agitated once with 20 cc. of a solution of sodium thiosulfate of 25% strength and three times with water, mixed with 3.0 grams of sodium acetate and 3.0 cc. of glacial acetic acid, and evaporated under vacuum. The residue contains, inter alia, Δ⁵-3:20-bis-ethylenedioxy-11β:19-oxido-19-iodo-pregnene; it is taken up in 30 cc. of acetic acid of 80% strength, heated for 2 hours at 100° C., and the reddish solutions mixed with 110 cc. of water and evaporated under vacuum. The residue contains Δ⁴-3:20-dioxo-11β:19-oxido-19-hydroxy-pregnene; it is extracted with ether+methylene chloride 4:1, and the resulting solution is washed with water, sodium bicarbonate solution and water, dried and evaporated. There are obtained 1.15 grams of a yellow foam which is taken up in 6 cc. of pyridine, mixed at 0° C. with a solution of 1.50 grams of chromium trioxide in 3.0 cc. of water and 3.0 cc. of pyridine, and the whole is oxidised for 18 hours. 15 grams of ice and 10 cc. of a sodium hydrosulfite solution of 40% strength are then added to the reaction mixture. After 15 minutes, the green solution is acidified with 2N-hydrochloric acid to acid reaction to Congo red and then extracted with ether+methylene chloride. The solution is washed neutral, dried and evaporated, to yield 1.05 grams of a yellowish foam.

A solution of 380 mg. of the crude product in benzene is chromatographed on silica gel. Apart from several unidentified products a crystalline fraction (45 mg.) is obtained which, after recrystallization from methylene chloride+petroleum ether, yields the 19:11-lactone of Δ⁴-3:20-dioxo-11β-hydroxypregnene-19-acid melting at 206–208° C. Subsequent preparative paper-chromatography furnishes a completely pure product; its infrared spectrum in carbon disulfide contains absorption bands inter alia at 5.60, 5.67, 5.76, 5.93, 7.31, 7.90, 8.17, 8.67, 9.05, 9.38, 9.64 and 10.06μ.

Alternatively, the product obtained by reacting 3:20-diethylenedioxy-11β-hydroxy-Δ⁵-pregnene with lead tetraacetate and iodine can be worked up in the following manner:

The reaction mixture is filtered through Celit, rinsed with cyclohexane, a few drops of pyridine are added, and the whole is evaporated under vacuum. The residue is taken up in 45 cc. of pyridine, an identical amount of silver acetate is added, and the whole is heated with stirring for 3 hours at 50° C. Inorganic constituents are then filtered off and the filtrate is evaporated under vacuum. By subsequent chromatography on silica gel there is obtained, inter alia, 3-ethylenedioxy-11β-19-oxido-20-oxo-Δ⁵-pregnene melting at 179–182° C. in a yield of about 15%. Optical rotation $[\alpha]_D^{25} = +108.8°$ (c=0.912). The infrared spectrum of the compound contains bands inter alia at 5.86, 6.75, 7.35, 9.15, 9.56, 9.70, 10.13 and 10.55μ and 11.82μ. By treatment with dilute acetic acid (2:1) for 20 minutes at 100° C., crystalline 3:20-dioxo-11β:19-oxido-Δ⁴-pregnene is obtained; its infrared spectrum contains absorption bands at 5.89, 6:02, 6.22, 7.40, 8.25, 9.68, 9.77, 10.02 and 11.52μ. The chromatogram further yields a small amount (about 5%) of 3-ethylenedioxy-11-hydroxy-20-oxo-Δ⁵-pregnene melting at 225° C., whose infrared spectrum contains bands at 5.86, 7.40, 8.88, 9.10, 9.40, 9.60, 9.75, 10.16 and 11.75μ.

The Δ⁵ - 3:20 - bisethylenedioxy - 11β-hydroxypregnene used as starting material for the reaction described in Example 3, is prepared in the following manner:

A solution of 2.95 grams of Δ⁵-3:20-bisethylenedioxy-11-oxopregnene in 50 cc. of absolute tetrahydrofuran is added dropwise within 15 minutes to a stirred and ice-cooled suspension of 1.8 grams of lithium aluminum hydride in 180 cc. of freshly distilled absolute tetrahydrofuran. The cooling bath is then replaced by a heating jacket, and the reaction mixture is stirred and refluxed for 2 hours. The excess reducing agent is then decomposed by adding 10 cc. of ethyl acetate to the ice-cooled mixture, and the aluminum hydroxide is precipitated in a filterable form with 10 cc. of saturated sodium sulfate solution and 15 grams of solid sodium sulfate. The precipitate is then suctioned off, exhaustively washed with tetrahydrofuran, benzene and methylene chloride, and the combined filtrates are evaporated under vacuum. The oily residue crystallizes when it is sprinkled with ether. After two recrystallizations from methylene chloride+petroleum ether, there are obtained 2.432 grams of Δ⁵-3:20-bis-ethylenedioxy-11β-hydroxypregnene in the form of fine needles melting at 147–148° C. (Another modification of the identical product melts at 138° C.). Optical rotation $[\alpha]_D = -22.1°$ (c=1.22 in chloroform).

EXAMPLE 4

800 mg. of iodine are added to a suspension, heated for a short time at 80° C., of 1.0 gram of calcium carbonate and 3.0 grams of pre-dried lead tetraacetate in 200 cc. of cyclohexane, the mixture is heated with stirring for 1 hour at 80° C. and then cooled to about 60° C.; 445 mg. of corticosterone acetate (Δ⁴-3:20 - dioxo - 11β-hydroxy-21-acetoxy-pregnene) are then added, and the deep violet reaction solution is refluxed and stirred for 4 hours. The mixture has by then become colorless; it is freed by filtration from solid constituents, the residue is thoroughly washed with 150 cc. of absolute ether, the filtrates are combined, washed with a solution of 5.0 grams of sodium thiosulfate in 10 cc. of water, then agitated with 2×50 cc. of water and evaporated under vacuum in a flask containing 1.5 grams of sodium acetate and 1.5 cc. of dimethyl formamide. 15 cc. of dimethyl formamide are added to the residue which is then heated for 2 hours at 100° C.; the brown reaction mixture is evaporated in a high vacuum, the resulting residue is taken up in ether+methylene chloride 4:1, and the solution is washed neutral with water, dried and evaporated, to yield 416 mg. of crude Δ⁴-3:20-dioxo-11β:19 - oxido-19:21-diacetoxy-pregnene in the form of a brown oil which is dissolved in 15 cc. of acetic acid of 70% strength and kept for 10 hours at 20° C. The solvent is then evaporated under a high vacuum at 20° C. and the residue is worked up with ether+methylene chloride and water. The yield of crude reaction product amounts to 400 mg.; it is decolorized by filtration through silica gel, and 225 mg. of the purified product—which still consists of a mixture of over 3 substances—is subjected to preparative separation on 150 sheets of paper in the system formamide/cyclohexane-benzene 1:2. One of the two less polar zones yields on extraction 102 mg. of crystals contaminated with oil. After two recrystallizations from ether+petroleum ether there are obtained 20 mg. of the 19:11-lactone of Δ⁴-3:20-dioxo-11β-hydroxy-21 - acetoxypregnene-19-acid melting at 120–122° C.

The infrared spectrum contains absorption bands inter alia at 5.60, 5.68, 5.75, 5.93, 7.82, 7.90, 8.17, 8.67, 9.38, 9.65 and 10.05μ.

EXAMPLE 5

A suspension of 6.0 grams of lead tetraacetate and 2.0 grams of calcium carbonate in 200 cc. of cyclohexane is heated with stirring at the boil for 30 minutes. 1.0 gram of 3:20-bisethylenedioxy - 11β - hydroxy-21-acetoxy-5α-pregnane and 1.6 grams of iodine are then added, and the whole is boiled with stirring, and while being irradiated with a 200 watt lamp, until the iodine color has disappeared (about 1 to 1½ hours). The reaction mixture is then cooled and filtered, and the filter residue is rinsed with 150 cc. of ether. The filtrate is then washed with 100 cc. of sodium thiosulfate solution of 10% strength and with water. 3.0 grams of dry sodium acetate and 10 cc. of dimethyl formamide are then added to the dried organic solution, and the mixture is evaporated under a water-jet vacuum at a bath temperature of 30–35° C. The residual oil is diluted with a further 10 cc. of dimethyl formamide and heated for 2 hours at 80° C. The solvent is then distilled off substantially completely under 0.1 mm. Hg pressure, the residue is dissolved in methylene chloride, and the solution is repeatedly washed with water. The dried methylene chloride solution is evaporated and the residue (1.27 grams), which contains the 3:20-bis-ethylenedioxy-11β:18-oxido - 18:21 - diacetoxy-5α-pregnane, is dissolved in 30 cc. of aqueous acetic acid of 90% strength and boiled for 20 minutes under nitrogen at a bath temperature of 140° C. The reaction mixture is allowed to cool, evaporated under a water-jet vacuum, and the residue is dried by being repeatedly evaporated with xylene and benzene under a water-jet vacuum, to yield 800 mg. of a yellow oil. 200 mg. of this crude product are subjected to preparative paper-chromatography on 120 sheets of Whatman paper in the system formamide-benzene. The zone of $R_f=0.5$, which gives a positive reaction with blue tetrazolium, is cut out, successively pasted with 500 cc. each of 20% aqueous tetrahydrofuran, 50% aqueous tetrahydrofuran and undiluted tetrahydrofuran, and after each pasting again suction-filtered. The filtrates are freed under a water-jet vacuum from tetrahydrofuran, the aqueous solution is extracted with methylene chloride, and the extracts are dried and evaporated. The residue is taken up in acetone, filtered through 50 mg. of animal charcoal, the filtrate is evaporated and the residue recrystallized from methylene chloride+ether, to yield 25 mg. of 3:20-dioxo-11β:18-oxido - 18 - hydroxy-21-acetoxy-5α-pregnane melting at 167–170° C. The infrared spectrum of the compound (in a methylene chloride solution) contains bands inter alia at 2.76, 5.73, 5.83, 8.14, 9.71, 10.07 and 10.20μ.

10 mg. of this compound are stirred with 15 mg. of potassium bicarbonate, 0.3 cc. of water and 1.2 cc. of methanol for 5 hours at 20–25° C. 1 drop of glacial acetic acid is then added and the whole is diluted with 20 cc. of methylene chloride. The solution is washed with water, dried and evaporated, to yield 8 mg. of 3:20-dioxo - 11β:18 - oxido - 18:21 - dihydroxy - 5α - pregnane as a colorless oil.

The 3:20 - bisethylenedioxy - 11β - hydroxy - 21 - acetoxy - 5α - pregnane, used as starting material, is prepared by ketalizing 3:20 - dioxo - 11β:21 - dihydroxy - 5α-pregnane with ethylene glycol and para - toluenesulfonic acid, followed by acetylation with pyridine and acetic anhydride.

EXAMPLE 6

1.0 gram of 3:20 - bisethylenedioxy - 11β - hydroxy-21 - acetoxy - 5α - pregnane is oxidized, as described in Example 5, with 6.0 grams of lead tetraacetate, 2.0 grams of calcium carbonate and 1.6 grams of iodine in 200 cc. of cyclohexane. The insoluble salts are filtered off and the filtrate is dried and evaporated to dryness. The residue is dissolved in 10 cc. of pyridine and the solution is added to a reaction mixture prepared from 1.0 gram of chromium trioxide, 2.0 grams of silver chromate, 10 cc. of water and 10 cc. of pyridine. The whole is heated, while being stirred, for 24 hours at 55° C., then cooled, diluted with 50 cc. of water and 80 cc. of ethyl acetate, agitated, and the undissolved salt is filtered off. The filter residue is thoroughly rinsed with ethyl acetate, and the filtrate is repeatedly agitated with water. The ethyl acetate solution is dried and then evaporated under a water-jet vacuum, to yield a yellow, oily residue (0.95 gram) which contains the 18:11 - lactone of 3:20 - bisethylenedioxy - 11β - hydroxy - 21 - acetoxy - 5α - pregnane - 18 - acid. The crude product is treated, as described in Example 5, with acetic acid of 90% strength, and the resulting reaction product is isolated by preparative paper-chromatography. The pure 18:11 - lactone of 3:20 - dioxo - 11β - hydroxy - 21 - acetoxy - 5α - pregnane - 18 - acid displays in the system formamide - benzene an $R_f$ value of about 0.65.

12.5 mg. of the 18:11 - lactone of 3:20 - dioxo - 11β - hydroxy - 21 - acetoxy - 5α - pregnane - 18 - acid in 2 cc. of methanol are stirred with 15 mg. of potassium bicarbonate and 0.3 cc. of water for 7 hours at 25° C. The reaction mixture is then diluted with methylene chloride, washed with water, the methylene chloride extracts are dried and evaporated under a water-jet vacuum, to yield 9 mg. of the 18:11 - lactone of 3:20 - dioxo - 11β:21 - dihydroxy - 5α - pregnane - 18 - acid.

EXAMPLE 7

To a boiling suspension of 48.0 g. lead tetraacetate, 16 grams of calcium carbonate in 1.6 liters of cyclohexane are added 12.8 g. of iodine and 8.0 grams of 3β - acetoxy - 11β - hydroxy - 20 - ethylenedioxy - 5α - pregnane. The mixture is boiled for another hour while being irradiated with a 500 watt lamp. The decolorized solution is cooled, filtered through Celite, the filter residue rinsed with cyclohexane, the combined filtrates washed with a thiosulfate solution of 25% strength and with water, dried and evaporated in a water-jet vacuum. There are obtained 13 grams of a crude oily product. The latter is taken up in 40 cc. of pyridine and treated for 16 hours at 40° C. with a suspension of 8 grams of silver acetate in 40 cc. of pyridine. The cooled reaction mixture is diluted with ether and water, filtered, the aqueous layer separated, the organic phase washed with water, dried and evaporated first in a water-jet vacuum and then in a high vacuum. The residue (9.8 grams) is dissolved in benzene and chromatographed on alumina and rechromatographed on silica gel. There are obtained the following compounds:

(1) 3β - acetoxy 11β, 19 - oxido - 20 - ethylenedioxy - 5α - pregnane, melting point (recrystallized from methylene chloride - ether - petroleum ether) 163–165° C. $[\alpha]_D^{25}=+44°$ (c=1.15 chloroform); IR bands inter alia at 5.78μ, 8.12μ, 9.52μ, 9.65μ, 9.75μ, 9.9μ and 10.05μ.

(2) 3β - acetoxy - 11β,18 - oxido - 20 - ethylenedioxy - 5α - pregnane (not purified) IR bands inter alia at 5.82μ, 6.86μ, 7.36μ, 8.13μ, 9.75μ, 10.10μ and 11.30μ.

(3) 3β,18α - diacetoxy - 11β,18 - oxido - 20 - ethylenedioxy - 5α - pregnane, melting point 183–184° C. (recrystallized from methylenechloride/ether/petroleum ether $[\alpha]_D^{25}=+9°$ (c=0.60 chloroform) IR bands inter alia at 5.73μ, 5.76μ, 8.12μ, 8.9μ, 9.3μ, 9.75μ, 10.1μ and 11.3μ.

(4) 3β - acetoxy - 19 - hydroxy - 11β,19 - oxido - 20 - ethylene - dioxy - 5α pregnane melting point 167–169° C. (crystallized from methylenechloride - ether petroleum ether $[\alpha]_D^{25}=+58°$ (c=0.86 chloroform) IR bands inter alia at 2.76μ, 8.80μ, 8.08μ, 9.37μ, 9.48μ and 9.73μ.

By heating the above-mentioned compounds with acetic acid of 66% strength at 95° C. for 20 minutes there are obtained:

(1) 3β - acetoxy - 11β,19 - oxido - 20 - oxo - 5α - pregnane melting point 141–142° C. recrystallized from ether/petroleum ether $[\alpha]_D^{25}=+115°$ (c=0.74 in chloroform) IR bands inter alia 5.80μ, 5.90μ, 8.07μ, 8.45μ, 9.72μ, 10.56μ and 10.76μ.

(2) 3β - acetoxy - 11β,18 - oxido - 20 - oxo - 5α - pregnane melting point 144–145° C. recrystallized from ether $[\alpha]_D^{25}=+82°$ (c=0.74 chloroform) IR bands 5.78μ, 5.87μ, 8.08μ, 9.68μ, 9.83μ, 10.46μ, 11.25μ and 11.38μ.

(3) 3β - acetoxy-11β,18 oxdo-18-hydroxy-20-oxo - 5α - pregnane melting at 188–189° C. (recrystallized from methylene chloride-ether-petroleum ether) $[\alpha]_D^{25}=+67°$ (c=0.62 in chloroform) IR bands inter alia at 2.76μ, 5.80μ, 5.90μ, 8.08μ, 9.25μ, 9.38μ, 9.64μ, and 10.41μ.

(4) 3β - acetoxy - 11β,19-oxido-19-hydroxy-20-oxo-5α-pregnane; IR bands inter alia at 2.75, 5.80, 5.91 8.07, 8.47, 9.20, 9.27, and 9.72.

By oxidation with 8 N solution of chromic acid in dilute sulfuric acid in acetone the two last-mentioned compounds are transformed into the corresponding lactones:

(1) The 18,11 lactone of the 3β-acetoxy-11β-hydroxy-20-oxo-5α-pregnane-18-acid melting at 187°–188° C. recrystallized from methylene chloride-ether-petroleum ether $[\alpha]_D^{25}=+39°$ (c=0.07 in chloroform); IR bands inter alia at 5.63μ, 5.78μ, 5.83μ, 8.09μ, 8.50μ, 8.68μ, 9.30μ, 9.72μ.

(2) The 11,19-lactone of the 3β-acetoxy-11β-hydroxy-20-oxo-5α-pregnane-19-acid (melting point 205–209° C.) recrystallized from methylene chloride ether; IR bands inter alia at 5.68, 5.80, 5.88, 8.08, 8.66, 8.91, 9.36 and 9.67.

What is claimed is:

1. Process for the oxidative conversion of the angular methyl groups of steroids, wherein an 11β-hydroxy-steroid unsubstituted in 18- and 19-position is treated with a lead tetraacetate having an oxidizing action in the presence of iodine.

2. Process as claimed in claim 1, wherein the reaction is carried out while irradiating the reaction mixture.

3. Process for the manufacture of 18-hydroxy-11,18-oxido-steroids wherein an 18-iodo-11β-18-oxido-steroid is treated with a hydrolyzing agent.

4. Process for the manufacture of 19-hydroxy-11β,19-oxido-steroids wherein a 19-iodo-11β,19-oxido-steroid is treated with a hydrolyzing agent.

5. Process for the manufacture of (11β→18)-lactones of 11β-hydroxy-steroid-18-acids, wherein an 18-iodo-11β, 18-oxido steroid is treated with a heavy metal chromate.

6. Process for the manufacture of (11β→19)-lactones of 11β-hydroxy-steroid-19-acids, wherein a 19-iodo-11,19-oxido-steroid is treated with a heavy metal chromate.

7. Process for the manufacture of (11β→19)-lactones of 11β-hydroxy-steroid-19-acids, wherein a 19-hydroxy-11β,19-oxido-steroid is treated with a member selected from the group consisting of chromium trioxide pyridine complex, chromium trioxide in acid solution and manganese dioxide.

8. Process for the manufacture of (11β→19)-lactones of 11β-hydroxy-steroid-19 acids, wherein a 19-unsubstituted 11β,19-oxido-steroid is treated with a member selected from the group consisting of chromium trioxide and ruthenian tetroxide.

9. A member selected from the group consisting of a compound having the formula

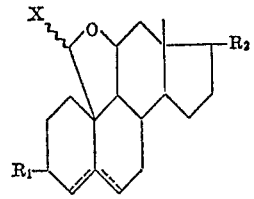

in which X is selected from the group consisting of hydrogen, iodine, hydroxy and oxo, $R_1$ is selected from the group consisting of hydroxy together with a hydrogen atom and oxo, $R_1$ being other than oxo when X is hydroxy, and $R_2$ is selected from the group consisting of hydroxy, acetyl and hydroxy-acetyl, a carboxylic acid ester derived from a carboxylic acid having 1 to 20 carbon atoms and an ether of the hydroxy compounds and an ethyleneketal of the ketones.

10. 3α-acetoxy-20-oxo-11:19-oxido-5β-pregnane.

11. Δ⁴-3:20-dioxo-11β:19-oxido-19-hydroxy-pregnene.

12. The 9:11-lactone of Δ⁴-3:20-dioxo-11β-hydroxy-pregnene-19-acid.

13. Δ⁵-3-ethylenedioxy-11β:19-oxido-20-oxo-pregnene.

14. Δ⁴-3:20-dioxo-11β:19-oxido-pregnene.

15. Δ⁴-3:20 - dioxo - 11β:19 - oxido - 19:21 - diacetoxy-pregnene.

16. The 19:11-lactone of Δ⁴-3:20-dioxo-11β-hydroxy-21-acetoxypregnene-19-acid.

17. A member selected from the group consisting of a compound of the formula

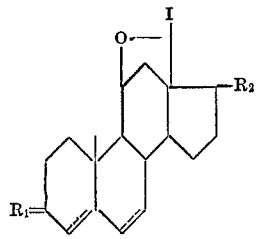

in which $R_1$ is selected from the group consisting of hydroxy together with a hydrogen atom and oxo, and $R_2$ is selected from the group consisting of hydroxy, acetyl and hydroxy-acetyl, a carboxylic acid ester derived from a carboxylic acid having 1 to 20 carbon atoms and an ether of the hydroxy compounds and an ethyleneketal of the ketones.

18. A member selected from the group consisting of a compound of the formula

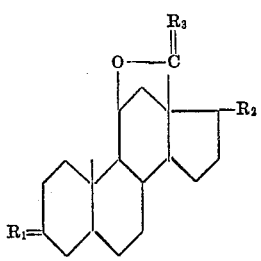

in which $R_1$ is a member selected from the group consisting of hydroxy together with a hydrogen atom and oxo, $R_2$ is selected from the group consisting of acetyl and hydroxyacetyl, and $R_3$ is a member selected from the group consisting of two hydrogen atoms, a hydrogen atom together with a hydroxyl group and an oxo group, and carboxylic acid ester derived from a carboxylic acid having 1 to 20 carbon atoms and ethers of the hydroxy compounds and an ethylene ketal of the ketones.

19. The 8:11-lactone of 3:20-dioxo-11β-hydroxy-5β-pregnane-18-acid.

20. The 3:20-dioxo - 11β:18 - oxido - 18 - hydroxy-21-acetoxy-5α-pregnane.

21. The 3:20-dioxo-11β:18-oxido-18:21-dihydroxy-5α-pregnane.

22. The 11,19-lactone of the 3β-acetoxy-11β-acetoxy-11β-hydroxy-20-oxo-5α-pregnane-19-acid.

23. A compound of the formula

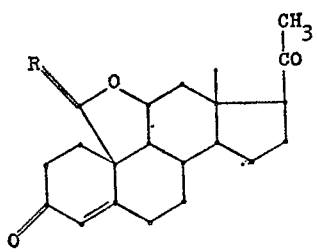

in which R represents a member selected from the group consisting of

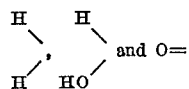

24. A compound of the formula

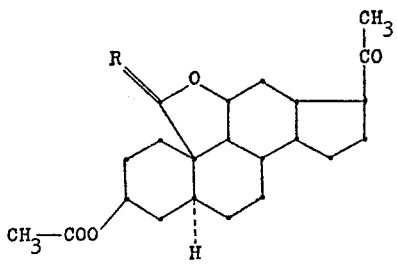

in which R represents a member selected from the group consisting of

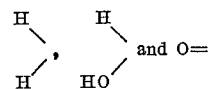

25. A compound of the formula

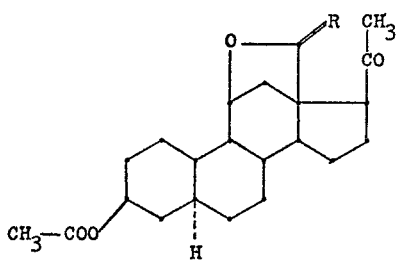

in which R represents a member selected from the group consisting of

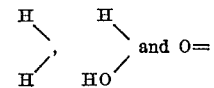

26. A compound of the formula

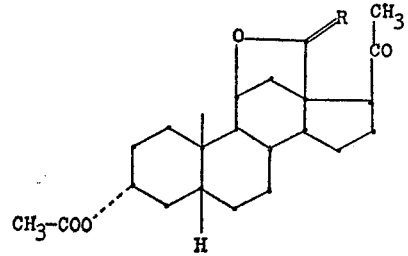

in which R represents a member selected from the group consisting of

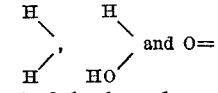

27. A compound of the formula

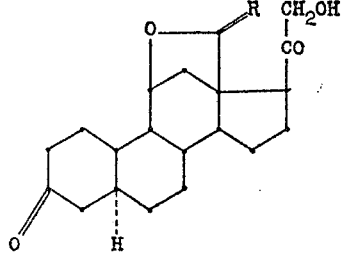

in which R represents a member selected from the group consisting of

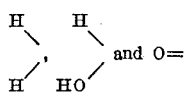

28. A compound having the formula

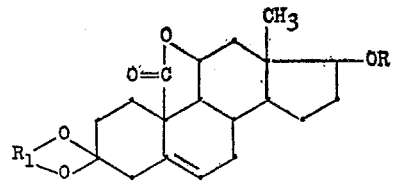

wherein R is selected from the group consisting of hydrogen and an acyl radical of a hydrocarbon carboxylic acid having 1 to 7 carbon atoms and $R_1$ is a lower alkylene radical.

29. The 10–11 lactone of 3-ethylenedioxy-$\Delta^5$-estrene-11$\beta$,17$\beta$-diol-10$\beta$-carboxylic acid.

References Cited

UNITED STATES PATENTS

| | | | |
|---|---|---|---|
| 3,033,859 | 5/1962 | Jeger et al. | 260—239.55 |
| 3,037,021 | 5/1962 | Muller et al. | 260—239.55 |
| 3,121,808 | 2/1964 | Mystre et al. | 260—239.55 |
| 3,178,414 | 4/1965 | Mystre et al. | 260—239.57 |

LEWIS GOTTS, *Primary Examiner.*

J. R. BROWN, H. FRENCH, *Assistant Examiners.*

UNITED STATES PATENT OFFICE
CERTIFICATE OF CORRECTION

Patent No. 3,385,848                                        May 28, 1968

Albert Wettstein et al.

It is certified that error appears in the above identified patent and that said Letters Patent are hereby corrected as shown below:

Column 12, lines 57 to 64, the formula should appear as shown below:

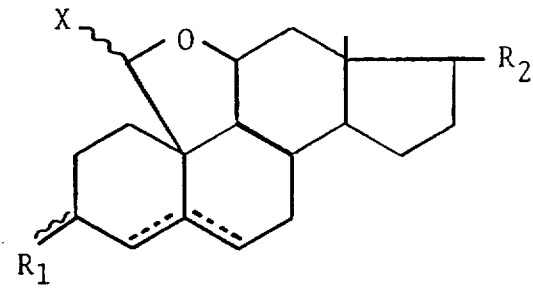

Column 13, lines 12 to 22, the formula should appear as shown below:

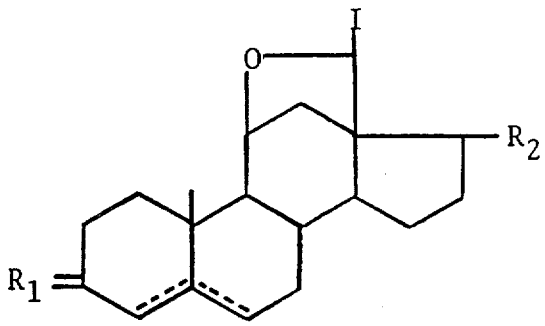

same column 13, line 55, "8:11-lactone" should read -- 18:11-lactone --; line 61, cancel "11β-acetoxy-".

Signed and sealed this 3rd day of February 1970.

(SEAL)
Attest:

EDWARD M. FLETCHER, JR.                        WILLIAM E. SCHUYLER, JR.
Attesting Officer                                 Commissioner of Patents